United States Patent
Guo

(10) Patent No.: US 12,133,279 B2
(45) Date of Patent: Oct. 29, 2024

(54) APPARATUS AND METHOD OF BEAM FAILURE RECOVERY FOR SECONDARY CELL

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 380 days.

(21) Appl. No.: 17/646,567

(22) Filed: Dec. 30, 2021

(65) Prior Publication Data

US 2022/0124860 A1 Apr. 21, 2022

Related U.S. Application Data

(63) Continuation of application No. PCT/CN2020/124441, filed on Oct. 28, 2020.
(Continued)

(51) Int. Cl.
*H04W 76/19* (2018.01)
*H04W 72/02* (2009.01)
(Continued)

(52) U.S. Cl.
CPC ........... *H04W 76/19* (2018.02); *H04W 72/02* (2013.01); *H04W 72/20* (2023.01); *H04L 1/1812* (2013.01)

(58) Field of Classification Search
CPC ..... H04W 76/19; H04W 72/02; H04W 72/20; H04W 76/15; H04W 16/28; H04L 1/1812; H04B 7/088; H04B 7/0695
See application file for complete search history.

(56) References Cited

U.S. PATENT DOCUMENTS

2019/0190582 A1 6/2019 Guo et al.
2020/0266876 A1* 8/2020 Yu .................. H04W 80/02
(Continued)

FOREIGN PATENT DOCUMENTS

WO 2019191960 A1 10/2019
WO 2019196118 A1 10/2019

OTHER PUBLICATIONS

3GPP TS 38.211 V15.5.0 (Mar. 2019), 3rd Generation Partnership Project; Technical Specification Group Radio Access Network; NR; Physical channels and modulation, 92 pages.
(Continued)

*Primary Examiner* — Walli Z Butt
(74) *Attorney, Agent, or Firm* — PERKINS COIE LLP

(57) ABSTRACT

An apparatus and a method of a beam failure recovery for a secondary cell are provided. The method performed by a user equipment (UE) includes being configured, by a base station, to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORE-SETs) in the SCell. This can solve issues in the prior art, provide a method for the UE to monitor up to two resources as one or more BFD RSs, provide a good communication performance, and/or provide high reliability.

15 Claims, 2 Drawing Sheets

400

410 → Being configured, by a base station, to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell

Related U.S. Application Data

(60) Provisional application No. 62/929,709, filed on Nov. 1, 2019.

(51) Int. Cl.
   *H04W 72/20*        (2023.01)
   *H04L 1/1812*     (2023.01)

(56) References Cited

U.S. PATENT DOCUMENTS

| | | | |
|---|---|---|---|
| 2020/0403682 A1* | 12/2020 | Koskela | H04W 24/08 |
| 2022/0287131 A1* | 9/2022 | Cao | H04W 24/04 |
| 2022/0408336 A1* | 12/2022 | Huang | H04W 36/305 |

OTHER PUBLICATIONS

3GPP TS 38.212 V15.5.0 (Mar. 2019), 3rd Generation Partnership Project; Technical Specification Group Radio Access Network; NR; Multiplexing and channel coding, 98 pages.

3GPP TS 38.213 V15.5.0 (Mar. 2019), 3rd Generation Partnership Project; Technical Specification Group Radio Access Network; NR; Physical layer procedures for control, 104 pages.

3GPP TS 38.214 V15.5.0 (Mar. 2019), 3rd Generation Partnership Project; Technical Specification Group Radio Access Network; NR; Physical layer procedures for data, 103 pages.

3GPP TS 38.215 V15.5.0 (Jun. 2019), 3rd Generation Partnership Project; Technical Specification Group Radio Access Network; NR; Physical layer measurements, 16 pages.

3GPP TS 38.321 V15.5.0 (Mar. 2019), 3rd Generation Partnership Project; Technical Specification Group Radio Access Network; NR; Medium Access Control (MAC) protocol specification, 77 pages.

3GPP TS 38.331 V15.5.0 (Mar. 2019), 3rd Generation Partnership Project; Technical Specification Group Radio Access Network; NR; Radio Resource Control (RRC) protocol specification, 489 pages.

International Search Report mailed Jan. 27, 2021 in International Application No. PCT/CN2020/124441.

Nokia, Nokia Shanghai Bell, Remaining Details on Beam Recovery, 3GPP TSG-RAN WG1 Meeting #93, R1-1807185 Busan, Korea, May 21-May 25, 2018, 8 pages.

Convida Wireless, On Beam Failure Recovery for SCell, 3GPP TSG-RAN WG1 #97, R1-1907466, Reno, USA, May 13-17, 2019, 7 pages.

Extended European Search Report for European Application No. 20881091.1 issued Jul. 1, 2022. 10 pages.

MediaTek Inc. "Summary 2 on Remaining issues on Beam Failure Delivery" R1-1807796; 3GPP TSG RAN WG1 Meeting #93; Busan, Korea; May 21-25, 2018. 29 pages.

* cited by examiner

APPARATUS AND METHOD OF BEAM FAILURE RECOVERY FOR SECONDARY CELL

CROSS-REFERENCE TO RELATED APPLICATIONS

The present application is a continuation application of International PCT Application No. PCT/CN2020/124441, filed on Oct. 28, 2020, which claims priority of U.S. provisional patent application No. 62/929,709, filed on Nov. 1, 2019. The above-identified applications are hereby incorporated by reference in their entirety.

BACKGROUND OF DISCLOSURE

1. Field of Disclosure

The present disclosure relates to the field of communication systems, and more particularly, to an apparatus and a method of a beam failure recovery for a secondary cell, which can provide a good communication performance and/or high reliability.

2. Description of Related Art

In current designs, a beam failure recovery (or called a link recovery) function is only supported for a primary cell (PCell). A method specified for a PCell link recovery is not applicable to a secondary cell (SCell). In a deployment scenario, the PCell and the SCell are on different bands, a beam monitoring on the PCell cannot provide any information for the SCell. Thus, a dedicated beam failure detection and recovery function is needed for the SCell.

Therefore, there is a need for an apparatus and a method of a beam failure recovery for a secondary cell (SCell), which can solve issues in the prior art, provide a method for the UE to monitor up to two resources as one or more BFD RSs, provide a good communication performance, and/or provide high reliability.

SUMMARY

An object of the present disclosure is to propose an apparatus and a method of a beam failure recovery for a secondary cell (SCell), which can solve issues in the prior art, provide a method for the UE to monitor up to two resources as one or more BFD RSs, provide a good communication performance, and/or provide high reliability.

In a first aspect of the present disclosure, a method of a beam failure recovery for a secondary cell (SCell) for a user equipment (UE) includes being configured, by a base station, to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell.

In a second aspect of the present disclosure, a user equipment (UE) of a beam failure recovery for a secondary cell (SCell) includes a memory, a transceiver, and a processor coupled to the memory and the transceiver. The processor is configured, by a base station, to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell.

In a third aspect of the present disclosure, a method of a beam failure recovery for a secondary cell (SCell) for a base station includes configuring, to a user equipment (UE), to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell.

In a fourth aspect of the present disclosure, a base station of a beam failure recovery for a secondary cell (SCell) includes a memory, a transceiver, and a processor coupled to the memory and the transceiver. The processor is configured to configure, to a user equipment (UE), to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
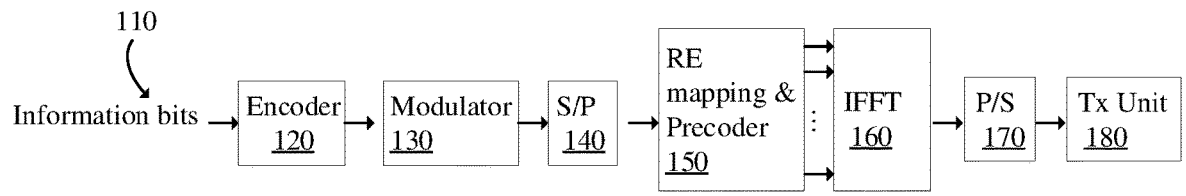
FIG. 1 illustrates a transmitter block diagram for a downlink (DL) or uplink (UL) transmission.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Fifth-generation (5G) wireless systems are generally a multi-beam based system in a frequency range 2 (FR2) ranging from 24.25 GHz to 52.6 GHz, where multiplex transmit (Tx) and receive (Rx) analog beams are employed by a base station (BS) and/or a user equipment (UE) to combat a large path loss in a high frequency band. In a high frequency band system, for example, mmWave systems, the BS and the UE are deployed with large number of antennas, so that a large gain beamforming can be used to defeat the large path loss and signal blockage. Due to the hardware limitation and cost, the BS and the UE might only be equipped with a limited number of transmission and reception units (TXRUs). Therefore, hybrid beamforming mechanisms can be utilized in both BS and UE. To get the best link quality between the BS and the UE, the BS and the UE need to align analog beam directions for a particular downlink or uplink transmission. For a downlink transmission, the BS and the UE need to find the best pair of a BS Tx beam and a UE Rx beam while for an uplink transmission, the BS and the UE need to find the best pair of the UE Tx beam and the BS Rx beam.

For a communication between one UE and a BS, the BS and the UE need to determine which Tx and Rx beam are going to be used. When one UE moves, the beams used by the BS and the UE for communication might change. In 3GPP 5G specification, the following functions are defined to support such multi-beam-based operation.

At an operation associated with beam measurement and reporting, in this function, the UE can measure one or multiple Tx beams of the BS and then the UE can select the best Tx beam and report his selection to the BS. By measuring the Tx beams of the BS, the UE can also measure one or more different Rx beams and then select the best Rx beam for one particular Tx beam of the BS. In this function, the gNB can also measure one or multiple Tx beams of the UE and then select the best Tx beam of the UE for an uplink transmission. To support measuring Tx beams of the BS, the BS can transmit multiple reference signal (RS) resources and then configures the UE to measure the RS resources. Then, the UE can report an index of one or more selected RS resources that are selected based on some measure metric, for example, a layer 1 reference signal received power (L1-RSRP). To support measuring Tx beams of the UE used for an uplink transmission, the BS can configure the UE to transmit one or more uplink RS resources, for example, sounding reference signal (SRS) resources, and then the BS can measure the RS resources. The BS can figure out which Tx beam of the UE is the best for the uplink transmission based on measuring, for example, L1-RSRP of the RS resources.

At an operation associated with beam indication, for a downlink transmission, the BS can indicate the UE of which Tx beam of the BS is used to transmit, so that the UE can use proper Rx beam to receive the downlink transmission. For a physical downlink control channel (PDCCH) transmission, the BS can indicate an identify (ID) of one Tx beam of the BS to the UE. For a physical sidelink discovery channel (PSDCH) transmission, the BS can use downlink control information (DCI) in a PDCCH to indicate the ID of one Tx beam that is used to transmit a corresponding PDSCH. For an uplink transmission from the UE, the BS can also indicate the UE of which Tx beam of the UE to be used. For example, for a physical uplink control channel (PUCCH) transmission, the UE uses a Tx beam that is indicated by the BS through a configuration of spatial relation information. For an SRS transmission, the UE uses the Tx beam that is indicated by the BS through the configuration of spatial relation information. For a physical uplink shared channel (PUSCH) transmission, the UE uses a Tx beam that indicated by an information element contained in a scheduling DCI.

At an operation associated with beam switch, this function is used by the BS to switch a Tx beam used for a downlink or uplink transmission. This function is useful when the Tx beam used for transmission currently is out of date due to for example a movement of the UE. When the BS finds a Tx beam currently used for a downlink transmission is not good or the BS finds another Tx beam that is better than the current Tx beam, the BS can send signaling to the UE to inform a change of Tx beam. Similarly, the BS can switch an uplink Tx beam of the UE used to transmit some uplink transmission.

In a communication system, such as a new radio (NR) system, DL signals can include control signaling conveying DCI through a PDCCH, data signals conveying information packet through a PDSCH and some types of reference signals. The DCI can indicate information of how the PDSCH is transmitted, including for example resource allocation and transmission parameters for the PDSCH. The BS can transmit one or more types of reference signals for different purposes, including a demodulation reference symbol (DM-RS) that is transmitted along with the PDSCH and can be used by the UE to demodulate the PDSCH, a channel state information reference signal (CSI-RS) that can be used by the UE to measure BS's Tx beam or CSI of a downlink channel between the BS and the UE, a phase tracking reference signal (PT-RS) that is also transmitted along with a PDSCH and can be used by the UE to estimate a phase noise caused by imperfection in a radio frequency (RF) part in a transmitter and a receiver and then compensate it when decoding the PDSCH. In NR, DL resource allocation for PDCCH, PDSCH, and reference signals is performed in a unit of orthogonal frequency division multiplexing (OFDM) symbols and a group of physical resource blocks (PRBs). Each PRB contains a few resource elements (REs), for example 12 REs, in a frequency domain. A transmission bandwidth (BW) of one downlink transmission consists of frequency resource unit called as resource blocks (RBs) and each RB consists of a few subcarriers or REs, for example, 12 subcarriers or 12 REs.

UL signals transmitted by the UE to the BS can include data signals conveying data packet through a PUSCH, uplink control signals conveying UL control information (UCI) which can be transmitted in the PUSCH or a PUCCH, and UL reference signals. The UCI can carry a schedule request (SR) used by the UE to request an uplink transmission resource, a hybrid automatic repeat request acknowledgement (HARQ-ACK) feedback for a PDSCH transmission or a channel state information (CSI) report. The UE can transmit one or more types of uplink reference signals for different purposes, including DM-RS that is transmitted along with a PUSCH transmission and can be used by the BS to demodulate the PUSCH, PT-RS that is also transmitted along with a PUSCH and can be used by the BS to estimate the phase noise caused by imperfection in RF parts and the BS then can compensate it when decoding PUSCH, and SRS signals that are used by the BS to measure one or more UE Tx beams or CSI of the uplink channel between the UE and the BS. Similarly, UL resource allocation for PUSCH, PUCCH, and UL reference signal is also performed in a unit of symbols and a group of PRBs.

A transmission interval for DL or UL channels/signals is referred to as a slot and each slot contains a few, for example 14, symbols in time domain. In a NR system, the duration of one slot can be 1, 0.5, 0.25 or 0.123 millisecond, for the subcarrier spacing 15 KHz, 30 KHz, 60 KHz, and 120 KHz, respectively. NR systems support flexible numerologies and an embodiment can choose proper OFDM subcarrier spacing based on the deployment scenario and service requirement. In the NR system, DL and UL transmission can use different numerologies.

FIG. 1 illustrates a transmitter block diagram for a DL or UL transmission. An embodiment of the transmitter block illustrated in FIG. 1 is for illustration only. Other embodiments could be used without departing from the scope of the present disclosure. Information bits 110 can be first encoded by an encoder 120 such as a low density parity check (LDPC) encoder or polar encoder, and then modulated by a modulator 130. The modulation can be, for example, binary phase-shift keying (BPSK), quadrature amplitude modulation (QAM) 4, QAM 16, QAM 64, or QAM 256. Then a serial to parallel (S/P) converter 140 can generate parallel multiple modulation symbols that are subsequently inputted to a RE mapper and precoder 150. The RE mapper and precoder 150 can map the modulation symbols to selected REs and then apply some precoder on the modulation symbols on the BW resource assigned to a DL or UL transmission. Then in 160, the modulation symbols are applied with an inverse fast fourier transform (IFFT) and an output thereof is then serialized by a parallel to serial (P/S) converter 170. Then the signals are sent to a Tx unit 180 including for example a digital-to-analog (D/A) convertor, a radio frequency convertor, a filter, a power amplifier, and Tx antenna elements, and transmitted out.

Figure 2:
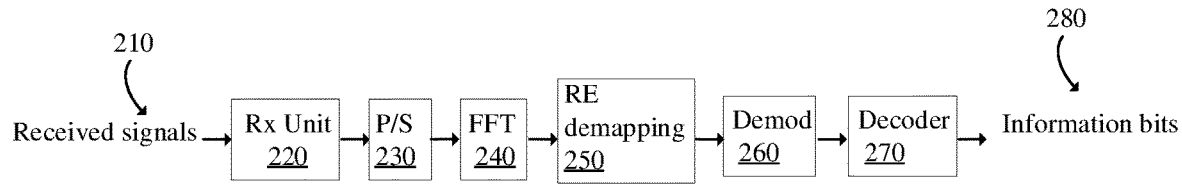
FIG. 2 illustrates a receiver block diagram for receiving a DL or UL transmission.

FIG. 2 illustrates a receiver block diagram for receiving a DL or UL transmission. An embodiment of the receiver block illustrated in FIG. 2 is for illustration only. Other embodiments could be used without departing from the scope of the present disclosure. Received signals 210 are first passed through a Rx unit 220 including for example Rx antenna elements, a low noise power amplifier, radio frequency converters, and filters. And an output thereof is passed through a P/S 230 and then applied an FFT 240. After converting into a frequency domain, useful signals are extracted by a RE demapping 250 according to a resource allocation for the DL or UL transmission. Subsequently, a demod 260 demodulates data symbols with a channel estimation that is calculated based on DM-RS and then a decoder 270 such as LDPC decoder or polar decoder, decodes the demodulated data to output information bits 280.

In 3rd generation partnership project (3GPP) release 15, a beam failure recovery function for a primary cell (PCell) is specified, which can be called as a link recovery. To perform a beam failure recovery for the primary cell, a user equipment can be configured with a set of reference signals (RSs) as a beam failure detection (BFD) RS and another set of RSs as a new beam identification (NBI) RS. The UE can first monitor the RS configured as the BFD RS and use a hypocritical block error rate (BLER) as metric to detect a beam failure of a physical downlink control channel (PDCCH) in one active bandwidth part (BWP) in the primary cell. If the UE detects the beam failure and the UE also finds at least one NBI RS that has a reference signal received power (RSRP) larger than a configured threshold, the UE then transmits a random access channel (RACH) preamble in a given RACH resource occasion which are configured to be associated with one NBI RS that is selected by the UE. A transmission of the RACH preamble in a given RACH resource can be considered as a beam failure recovery request (BFRR) to a gNB. If the gNB detects such a relay-assisted cellular network (RACN) preamble successfully, the gNB would use a quasi-co-location (QCL) assumption of the NBI RS indicated by the detected RACH preamble to transmit PDCCH in a search space that is dedicated for beam failure recovery response. After sending the RACH preamble as the BFRR, the UE can begin to monitor the PDCCH in the dedicated search space and if a valid PDCCH is detected, the UE can assume the gNB to receive the BFRR successfully.

In 5G NR release 15, multi-beam-based systems are supported. Multiplex Tx and Rx analog beams are employed by a base station (BS) and/or a user equipment (UE) to combat the large path loss in high frequency band. In a high frequency band system, for example, mmWave systems, the BS and the UE are deployed with large number of antennas so that large gain beamforming can be used to defeat the large path loss and signal blockage. Due to the hardware limitation and cost, the BS and the UE might only be equipped with limited number of TXRUs (transmission and reception units). Therefore, hybrid beamforming mechanisms can be utilized in both the BS and the UE. To get the best link quality between the BS and the UE, the BS and the UE need to align the analog beam directions for particular downlink or uplink transmission. For downlink transmission, they need find the best pair of BS Tx beam and UE Rx beam while for uplink transmission, they need to find the best pair of UE Tx beam and BS Rx beam. In 3GPP 5G specification, the following functions are defined to support such multi-beam-based operation: beam measurement and reporting, beam indication and beam switch.

Current NR specification only supports the beam failure recovery function for a primary cell (PCell). The feature of PCell beam failure recovery is based on uplink RACH transmission. For beam failure detection, the UE is configured with a set of beam failure detection RS $q_0$. The UE measures hypothetical BLER (block error rate) on each RS in set $q_0$. When hypothetical BLER of all the RSs in set $q_0$ is above some threshold, the UE declares beam failure event for the PCell and then the UE can send a RACH transmission that is configured for beam failure recovery. After sending RACH, the UE monitors a dedicated CORESET for beam failure recovery to detect the response from a base station such as a gNB.

For beam failure recovery in SCell, a current design is using MAC CE message to report an ID of one SCell where beam failure happens. The UE can also report on ID of new beam through the MAC CE message.

In some embodiments of the present disclosure, for beam failure recovery operation on one SCell, the UE can only be configured with up to 2 beam failure detection (BFD) RSs.

But there could be more than 2 CORESETs for PDCCH monitor in one BWP in that SCell. When the UE is configured to implicitly derive BFD RSs, some embodiments define a technical solution for the UE to choose up to 2 BFD RSs from more than 2 CORESETs.

In some embodiments of the present disclosure, for beam failure recovery of one SCell, the UE can declare the completeness of beam failure recovery after a base station's response (such as gNB's response) is received by the UE and begins to assume a default beam on the PDCCH/PDSCH transmission. The timing of gNB's response defined and the UE behavior is also defined in some embodiments of the present disclosure. Furthermore, in some embodiments, a step-2 MAC-CE message can be carried in various type of uplink transmission, including PUSCH, PUSCH of configured grant, msg3 PUSCH of a RACH, or msgA of a 2-step RACH.

Figure 3:
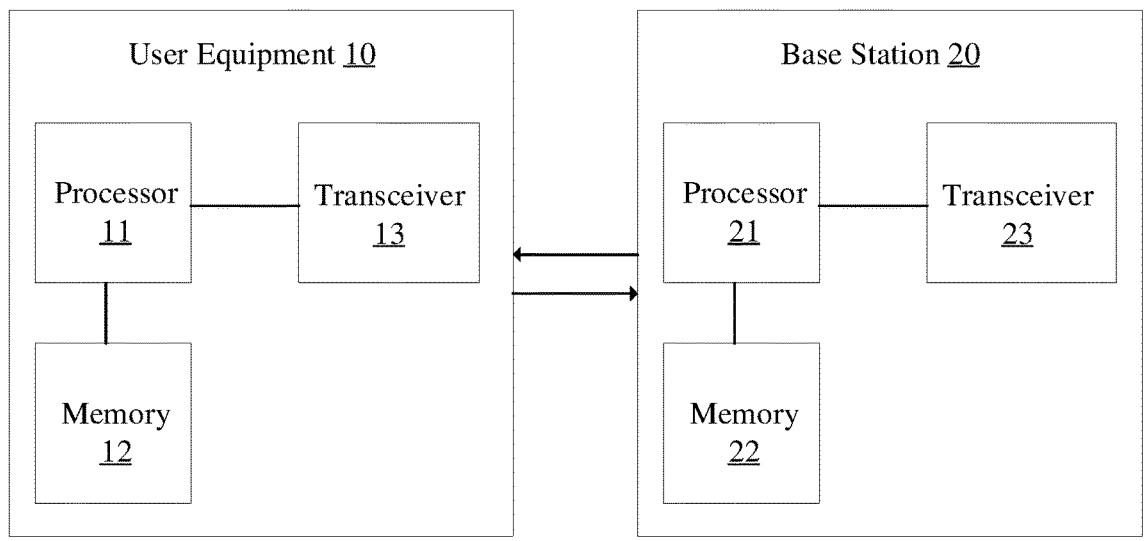
FIG. 3 is a block diagram of a user equipment (UE) and a base station of a beam failure recovery for a secondary cell (SCell) according to an embodiment of the present disclosure.

FIG. 3 illustrates that, in some embodiments, a user equipment (UE) 10 and a base station 20 of a beam failure recovery for a secondary cell (SCell) according to an embodiment of the present disclosure are provided. The UE 10 may include a processor 11, a memory 12, and a transceiver 13. The base station 20 may include a processor 21, a memory 22 and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface.

In some embodiments, the processor 11 is configured, by the base station 20, to perform a beam failure recovery on one SCell, wherein when the UE 10 is not provided with one or more resource indexes for detecting beam failure, the UE 10 monitors up to two resources as one or more beam failure detection (BFD) reference signals (RSs) to detect a beam failure of the SCell according to transmission configuration indicator (TCI) states configured to control resource sets (CORESETs) in the SCell. This can solve issues in the prior art, provide a method for the UE to monitor up to two resources as one or more BFD RSs, provide a good communication performance, and/or provide high reliability.

In some embodiments, the processor 21 is configured to configure, to the UE 10, to perform a beam failure recovery on one SCell, wherein when the UE 10 is not provided with one or more resource indexes for detecting beam failure, the UE 10 monitors up to two resources as one or more beam failure detection (BFD) reference signals (RSs) to detect a beam failure of the SCell according to transmission configuration indicator (TCI) states configured to control resource sets (CORESETs) in the SCell. This can solve issues in the prior art, provide a method for the UE to monitor up to two resources as one or more BFD RSs, provide a good communication performance, and/or provide high reliability.

Figure 4:
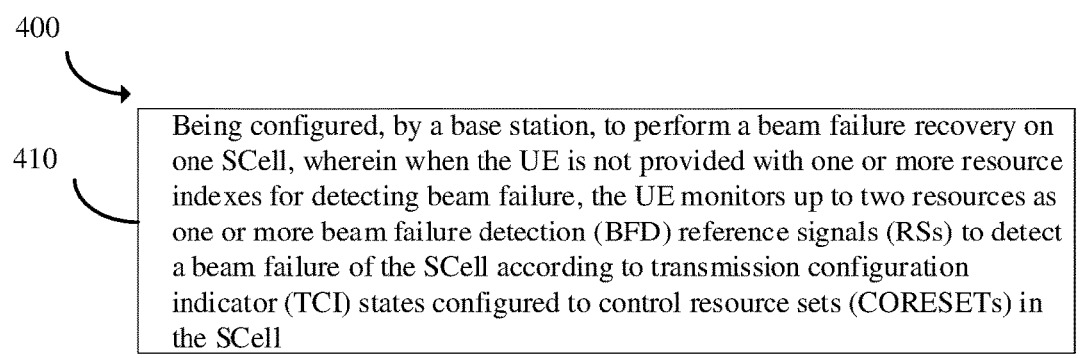
FIG. 4 is a flowchart illustrating a method of a beam failure recovery for a secondary cell (SCell) for a UE according to an embodiment of the present disclosure.

FIG. 4 illustrates a method 400 of a beam failure recovery for a secondary cell (SCell) for a UE according to an embodiment of the present disclosure. The method 400 includes: a block 410, being configured, by a base station, to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell. This can solve issues in the prior art, provide a method for the UE to monitor up to two resources as one or more BFD RSs, provide a good communication performance, and/or provide high reliability.

Figures 5, 6:
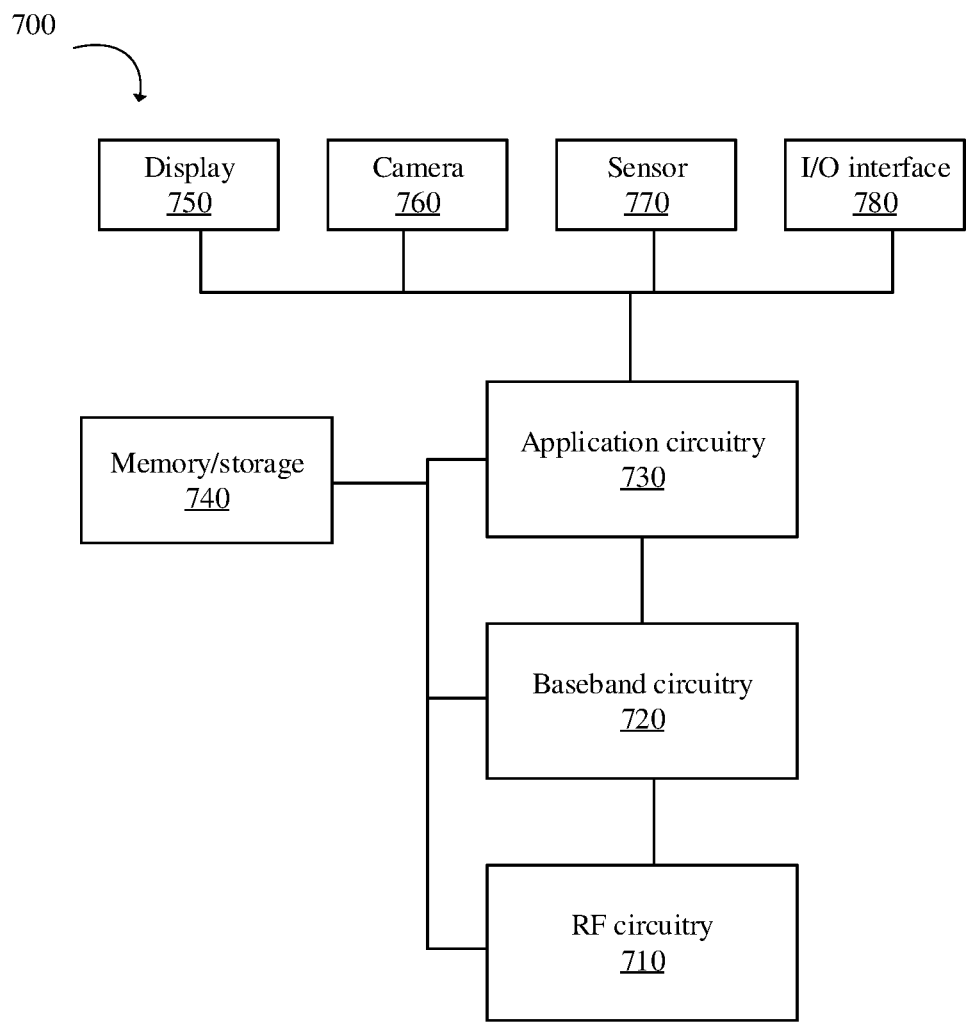
FIG. 5 is a flowchart illustrating a method of a beam failure recovery for a secondary cell (SCell) for a base station according to an embodiment of the present disclosure.
FIG. 6 is a block diagram of a system for wireless communication according to an embodiment of the present disclosure.

FIG. 5 illustrates a method 500 of a beam failure recovery for a secondary cell (SCell) for a base station according to an embodiment of the present disclosure. The method 500 includes: a block 510, configuring, to a user equipment (UE), to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell. This can solve issues in the prior art, provide a method for the UE to monitor up to two resources as one or more BFD RSs, provide a good communication performance, and/or provide high reliability.

In some embodiments, the UE derives the one or more resource indexes according to the TCI states configured to the CORESETs that the UE is used to monitor a physical downlink control channel (PDCCH) in a bandwidth part (BWP) of the SCell. In some embodiments, if there are more than two resource indexes according to the TCI states configured to the CORESETs in the SCell, the UE picks up to the two resources from the more than two resource indexes. In some embodiments, the resource indexes comprise channel state information reference signal (CSI-RS) resource indexes, the resources comprise CSI-RS resources, and/or the TCI states comprise TCI state identifiers (IDs).

In some embodiments, the UE picks up to the two resources as the one or more BFD RSs for the SCell according one or combination of more than one of the followings: the UE picks up to two periodic resources with smallest periodicity among all the resources that are configured as quasi-co-location (QCL) type D (QCL-TypeD) in the TCI states configured to the CORESETs in the SCell; the UE picks up to the two periodic resources with largest periodicity among all the resources that are configured as the QCL-TypeD in the TCI states configured to the CORESETs in the SCell; the UE picks up to the two periodic resources configured as the QCL-typeD in the TCI states configured to the CORESETs with a lowest CORESET ID among all the CORESETs configured in the SCell; the UE picks up to the two periodic resources configured as QCL-typeD in the TCI states configured to the CORESETs with a largest CORESET ID among all the CORESETs configured in the SCell; if the two periodic resources have same periodicity, the UE picks the one that is configured as QCL-typeD in the TCI states configured to the CORESET with a lower CORESET ID; if the two periodic resources have same periodicity, the UE pick the one that is configured as QCL-typeD in the TCI states configured to the CORESET with a larger CORESET ID; the UE picks up to the two periodic resources with a smallest CSI-RS configuration index; the UE picks up to the two periodic resources with a largest CSI-RS configuration index; the UE picks up to the two periodic resources with a smallest layer 1 reference signal received power (L1-RSRP); or the UE picks up to the two periodic resources with a largest L1-RSRP.

In some embodiments, the method further comprises transmitting, from the UE to the base station, a message carrying a SCell ID of the SCell with the beam failure in a physical uplink shared channel (PUSCH) transmission. In some embodiments, the message comprises a medium access control (MAC) control element (CE) message. In some embodiments, the MAC CE message comprises a step-2 MAC CE for SCell BFR. In some embodiments, after the UE receives, from the base station, a response to the message, the UE declares the message is received by the base station successfully and the UE declares the BFR for the SCell is completed. In some embodiments, if the message is carried in the PUSCH transmission scheduled by a downlink control information (DCI), the response from the base station for the message comprises at least one of the followings: the UE receives the DCI from the base station which schedules a new transmission for a same hybrid automatic repeat request (HARQ) process number; the UE does not receive the DCI from the base station which schedules re-transmission for a same HARQ process number before a first timer expires; or the UE does not receive the DCI from the base station which schedules re-transmission for a same HARQ process number within a time window that starts after the UE sends the PUSCH transmission carrying the message.

In some embodiments, if the message is carried in the PUSCH transmission scheduled by a configured grant, the response from the base station for the message comprises at least one of the followings: the UE does not receive a DCI from the base station which schedules re-transmission for a HARQ process of the configured grant before a second timer expires; or the UE does not receive a DCI from the base station which schedules re-transmission for a HARQ process of the configured grant within a time window that starts after the UE sends the PUSCH transmission carrying the message. In some embodiments, if the message is carried in a message A (msgA) of a 2-step random access channel (RACH), the response from the base station for the message comprises the UE receives a message B (msgB) from the base station. In some embodiments, if the message is carried in the PUSCH transmission scheduled by a random access response (RAR) uplink (UL) grant, the response from the base station for the message comprises a PDCCH transmission that is addressed to a cell-radio network temporary identifier (C-RNTI) of the UE and comprises a UL grant for a new transmission. In some embodiments, if the message is carried in the PUSCH transmission scheduled by a RAR UL grant, the response from the base station for the message comprises a PDCCH transmission that is addressed to a C-RNTI of the UE.

In some embodiments, time for the UE to declare that the message of SCell BFR is received by the base station correctly and declare that the BFR for the SCell is completed comprises at least one of the followings: if the message is carried in the PUSCH transmission scheduled by a DCI, the time is the last symbol of PDCCH where the DCI scheduling a new transmission for the same HARQ process is received; if the message is carried in the PUSCH transmission scheduled by the DCI, the time is the time when a first timer expires and the UE does not receive the DCI scheduling re-transmission for the same HARQ process; if the message is carried in the PUSCH transmission of a message 3 (msg3) in a RACH procedure, the time is the last symbol of a message 4 (msg4) of the same RACH procedure is received; if the message is carried in a msg A of a 2-step RACH, the time is the last symbol of a msgB of the same 2-step RACH is received; or if the message is carried in the PUSCH transmission of a configured grant, the time is the time when a second timer expires and the UE does not receive the DCI scheduling re-transmission for the configured grant.

In some embodiments, after k symbols from the time when the UE receives the response from the base station to the message and if the message carries a RS ID that indicates a newly identified RS for SCell BFD, the UE assumes at least one of the followings: the UE uses the newly identified RS as a spatial relation information for transmission on PUCCH resources configured in the SCell; the UE uses the newly identified RS as the spatial relation information for sounding reference signal (SRS) resources configured for codebook-based transmission in the SCell; the UE uses the newly identified RS as the spatial relation information for the SRS resources configured for non-codebook-based transmission in the SCell if an associated CSI-RS for the SRS for non-codebook-based transmission is not configured; or the UE uses the newly identified RS as the spatial relation information for the SRS resources configured for port switch in the SCell. In some embodiments, a value of k symbols comprises 14, 28, 42, or 56 symbols.

Example

In some embodiments, a UE can be configured to monitor beam failure of one SCell. The UE can be provided with one or more CSI-RS resource indexes for detecting the beam failure of that SCell. If the UE is configured to operate beam failure recovery on one SCell but the UE is not provided with CSI-RS resource index(es) for detecting beam failure, the UE derives one or more CSI-RS resource indexes based on TCI-state IDs configured to CORESETs in that SCell for the UE to detect PDCCH. According to the specification, the UE only need to monitor up to 2 CSI-RS resources to detect beam failure of one SCell, thus if the UE can find more than 2 CSI-RS resource indexes according to the TCI-state IDs configured to the CORESETs in that SCell, the UE follows some technical solutions to pick 2 from those CSI-RS resource indexes. The UE can pick up to two CSI-RS resources as the beam failure detection RSs for one SCell according one or combination of more than one of the followings:
    1.The UE picks up to two periodic CSI-RS resources with smallest periodicity among all the CSI-RS resources that are configured as QCL-TypeD in the TCI-states configured to the CORESETs in that SCell.

2. The UE picks up to two periodic CSI-RS resources with largest periodicity among all the CSI-RS resources that are configured as QCL-TypeD in the TCI-states configured to the CORESETs in that SCell.
3. The UE picks up to two periodic CSI-RS resources configured as QCL-typeD in the TCI-states configured to the CORESETs with lowest CORESET ID among all the CORESETs configured in that SCell.
4. The UE picks up to two periodic CSI-RS resources configured as QCL-typeD in the TCI-states configured to the CORESETs with largest CORESET ID among all the CORESETs configured in that SCell.
5. If two periodic CSI-RS resources have same periodicity, the UE can pick the one that is configured as QCL-typeD in the TCI-states configured to the CORESET with lower CORESET ID.
6. If two periodic CSI-RS resources have same periodicity, the UE can pick the one that is configured as QCL-typeD in the TCI-states configured to the CORESET with larger CORESET ID.
7. The UE picks up to two periodic CSI-RS resources with smallest CSI-RS configuration index.
8. The UE picks up to two periodic CSI-RS resources with largest CSI-RS configuration index.
9. The UE picks up to two periodic CSI-RS resources with smallest L1-RSRP.
10. The UE picks up to two periodic CSI-RS resources with largest L1-RSRP.

In the above embodiments, some methods include the followings:

In a method, a UE can be configured with a list of beam failure detection RSs, $\bar{q}_0$, for each BWP of a SCell. If the UE is not provided with the list of beam failure detection RSs, $\bar{q}_0$, for that BWP, the UE determines the set $\bar{q}_0$ to include periodic CSI-RS resource configuration indexes with same values as the RS indexes in the RS sets indicated by TCI-state for respective CORESETs that the UE uses for monitoring PDCCH and if there are two RS indexes in a TCI state, the set $\bar{q}_0$ includes RS indexes with QCL-TypeD configuration for the corresponding TCI states. The UE expects the set $\bar{q}_0$ to include up to two RS indexes. If the UE can derive more than 2 such periodic CSI-RS resource configuration indexes from the TCI-state for all the respective CORESETs that the UE uses for monitoring PDCCH in the given BWP of a SCell, the UE only includes the two periodic CSI-RS resource indexes with lowest periodicity among all derived CSI-RS configuration indexes in the set $\bar{q}_0$.

In a method, a UE can be configured with a list of beam failure detection RSs, $\bar{q}_0$, for each BWP of a SCell. If the UE is not provided with the list of beam failure detection RSs, $\bar{q}_0$, for that BWP, the UE determines the set $\bar{q}_0$ to include periodic CSI-RS resource configuration indexes with same values as the RS indexes in the RS sets indicated by TCI-state for respective CORESETs that the UE uses for monitoring PDCCH and if there are two RS indexes in a TCI state, the set $\bar{q}_0$ includes RS indexes with QCL-TypeD configuration for the corresponding TCI states. The UE expects the set $\bar{q}_0$ to include up to two RS indexes. If the UE can derive more than 2 such periodic CSI-RS resource configuration indexes from the TCI-state for all the respective CORESETs that the UE uses for monitoring PDCCH in the given BWP of a SCell, the UE only includes the two periodic CSI-RS resource indexes with largest periodicity among all derived CSI-RS configuration indexes in the set $\bar{q}_0$.

In a method, a UE can be configured with a list of beam failure detection RSs, $\bar{q}_0$, for each BWP of a SCell. If the UE is not provided with the list of beam failure detection RSs, $\bar{q}_0$, for that BWP, the UE determines the set $\bar{q}_0$ to include periodic CSI-RS resource configuration indexes with same values as the RS indexes in the RS sets indicated by TCI-state for respective CORESETs that the UE uses for monitoring PDCCH and if there are two RS indexes in a TCI state, the set $\bar{q}_0$ includes RS indexes with QCL-TypeD configuration for the corresponding TCI states. The UE expects the set $\bar{q}_0$ to include up to two RS indexes. If the UE can derive more than 2 such periodic CSI-RS resource configuration indexes from the TCI-state for all the respective CORESETs that the UE uses for monitoring PDCCH in the given BWP of a SCell, the UE only includes the two periodic CSI-RS resource indexes corresponding to the CORESETs with lowest CORESET IDs among all derived CSI-RS configuration indexes in the set $\bar{q}_0$.

In a method, a UE can be configured with a list of beam failure detection RSs, $\bar{q}_0$, for each BWP of a SCell. If the UE is not provided with the list of beam failure detection RSs, $\bar{q}_0$, for that BWP, the UE determines the set $\bar{q}_0$ to include periodic CSI-RS resource configuration indexes with same values as the RS indexes in the RS sets indicated by TCI-state for respective CORESETs that the UE uses for monitoring PDCCH and if there are two RS indexes in a TCI state, the set $\bar{q}_0$ includes RS indexes with QCL-TypeD configuration for the corresponding TCI states. The UE expects the set $\bar{q}_0$ to include up to two RS indexes. If the UE can derive more than 2 such periodic CSI-RS resource configuration indexes from the TCI-state for all the respective CORESETs that the UE uses for monitoring PDCCH in the given BWP of a SCell, the UE only includes the two periodic CSI-RS resource indexes corresponding to the CORESETs with largest CORESET IDs among all derived CSI-RS configuration indexes in the set $\bar{q}_0$.

In a method, a UE can be configured with a list of beam failure detection RSs, $\bar{q}_0$, for each BWP of a SCell. If the UE is not provided with the list of beam failure detection RSs, $\bar{q}_0$, for that BWP, the UE determines the set $\bar{q}_0$ to include periodic CSI-RS resource configuration indexes with same values as the RS indexes in the RS sets indicated by TCI-state for respective CORESETs that the UE uses for monitoring PDCCH and if there are two RS indexes in a TCI state, the set $\bar{q}_0$ includes RS indexes with QCL-TypeD configuration for the corresponding TCI states. The UE expects the set $\bar{q}_0$ to include up to two RS indexes. If the UE can derive more than 2 such periodic CSI-RS resource configuration indexes from the TCI-state for all the respective CORESETs that the UE uses for monitoring PDCCH in the given BWP of a SCell, the UE only includes the two periodic CSI-RS resource indexes with lowest periodicity among all derived CSI-RS configuration indexes in the set $\bar{q}_0$. If two periodic CSI-RS resources have same periodicity, the UE includes the one corresponding to the CORESET with smaller CORESET ID among those two CORESETs.

Another alternative method: If the UE can derive more than 2 such periodic CSI-RS resource configuration indexes from the TCI-state for all the respective CORESETs that the UE uses for monitoring PDCCH in the given BWP of a SCell, the UE shall only include the two periodic CSI-RS resource indexes with lowest periodicity among all derived CSI-RS configuration indexes in the set $\bar{q}_0$. If two periodic CSI-RS resources have same periodicity, the UE includes the one corresponding to the CORESET with larger CORESET ID among those two CORESETs.

Another alternative method: If the UE can derive more than 2 such periodic CSI-RS resource configuration indexes from the TCI-state for all the respective CORESETs that the UE uses for monitoring PDCCH in the given BWP of a SCell, the UE shall only include the two periodic CSI-RS resource indexes with largest periodicity among all derived CSI-RS configuration indexes in the set $\bar{q}_0$. If two periodic CSI-RS resources have same periodicity, the UE includes the one corresponding to the CORESET with smaller CORESET ID among those two CORESETs.

Another alternative method: If the UE can derive more than 2 such periodic CSI-RS resource configuration indexes from the TCI-state for all the respective CORESETs that the UE uses for monitoring PDCCH in the given BWP of a SCell, the UE shall only include the two periodic CSI-RS resource indexes with largest periodicity among all derived CSI-RS configuration indexes in the set $\bar{q}_0$. If two periodic CSI-RS resources have same periodicity, the UE includes the one corresponding to the CORESET with larger CORESET ID among those two CORESETs.

In a method, a UE can be configured with a list of beam failure detection RSs, $\bar{q}_0$, for each BWP of a SCell. If the UE is not provided with the list of beam failure detection RSs, $\bar{q}_0$, for that BWP, the UE determines the set $\bar{q}_0$ to include periodic CSI-RS resource configuration indexes with same values as the RS indexes in the RS sets indicated by TCI-state for respective CORESETs that the UE uses for monitoring PDCCH and if there are two RS indexes in a TCI state, the set $\bar{q}_0$ includes RS indexes with QCL-TypeD configuration for the corresponding TCI states. The UE expects the set $\bar{q}_0$ to include up to two RS indexes. If the UE can derive more than 2 such periodic CSI-RS resource configuration indexes from the TCI-state for all the respective CORESETs that the UE uses for monitoring PDCCH in the given BWP of a SCell, the UE only includes the two periodic CSI-RS resource indexes with lowest (or largest) CSI-RS configuration indexes among all derived CSI-RS configuration indexes in the set $\bar{q}_0$.

Example

In some embodiments, a UE can be configured to operate beam failure recovery for a SCell. The UE can send one MAC-CE message carrying the SCell ID of the SCell with beam failure in a PUSCH transmission. That MAC-CE message can also be called step-2 MAC CE for SCell beam failure recovery. After the UE receives the gNB's response to that MAC-CE, the UE can claim the MAC-CE is received by the gNB successfully and the UE can claim the beam failure recovery for that SCell is completed. The MAC-CE message can be carried in various PUSCH transmission and the gNB's response can be defined accordingly at least one of as the followings.

If the MAC-CE message is carried in a PUSCH scheduled by a DCI format, the gNB's response for the MAC-CE can be at least one of as the followings.

An alternative method: the UE receives one DCI from the gNB which schedules a new transmission for the same HARQ process number.

An alternative method: The UE does not receive one DCI from the gNB which schedules re-transmission for the same HARQ process number before a second timer expires.

An alternative method: The UE does not receive one DCI from the gNB which schedules re-transmission for the same HARQ process number within a time window that starts after the UE sends the PUSCH carrying that MAC-CE.

If the MAC-CE message is carried in a PUSCH scheduled by a configured grant, the gNB's response for that MAC-CE can be at least one of as the followings.

An alternative method: The UE does not receive one DCI from the gNB which schedules re-transmission for the HARQ process of the configured grant before a second timer expires.

An alternative method: The UE does not receive one DCI from the gNB which schedules re-transmission for the HARQ process of the configured grant within a time window that starts after the UE sends the PUSCH carrying that MAC-CE.

If the MAC-CE message is carried in msgA of a 2-step RACH, the gNB's response for that MAC-CE can be that the UE receives msgB from the gNB.

If the MAC-CE message is carried in a PUSCH scheduled by RAR UL grant, the gNB's response for that MAC-CE can be the a PDCCH transmission that is addressed to the C-RNTI and contains a UL grant for a new transmission.

If the MAC-CE message is carried in a PUSCH scheduled by RAR UL grant, the gNB's response for that MAC-CE can be the a PDCCH transmission that is addressed to the C-RNTI.

Example

In some embodiments, after K symbols after UE receiving gNB's response to the MAC-CE, the UE can assume to apply a default Tx beam on the PUCCH resources, SRS resources configured for codebook-based transmission and SRS resources configured for non-codebook-based transmission and SRS resources configured for port switch. The example value of K can be 14, 28, 42 or 56 symbols.

The UE can report a RS index $q_{new}$ in the MAC-CE message. After K symbols from the last symbols of a first PDCCH reception that schedules a new transmission for the same HARQ process number as in the PUSCH carrying the MAC CE, or after K symbols from the time when the timer expires, or after K symbols from the last symbol of msgB, or after K symbols from the last symbol of a first PDCCH reception that is addressed to the C-RNTI and contains a UL grant for a new transmission as one of the followings.

1. The UE transmits a PUCCH on a same cell using a same spatial filter corresponding to $q_{new}$.
2. The UE transmits SRS resources contained in a SRS resource set that is configured with the higher layer parameter usage='codebook' using a same spatial filter corresponding to $q_{new}$.
3. The UE transmits SRS resources contained in an SRS resource set that is configured with the higher layer parameter usage='Noncodebook' using a same spatial filter corresponding to $q_{new}$, if the SRS resource set is configured with higher layer parameter associatedCSI-RS.
4. For an SRS resource set configured with higher layer parameter usage='Noncodebook', if the SRS resource set is configured with higher layer parameter associatedCSI-RS, the UE can assume the higher layer parameter associatedCSI-RS is updated to be $q_{new}$; or if the SRS resource set is not configured with higher layer parameter associatedCSI-RS, the UE can assume the spatial relation configuration of all SRS resources in that set is updated to be $q_{new}$.
5. For an SRS resource set configured with higher layer parameter usage='antennaSwtiching', the UE transmit one SRS resource in that set with a spatial filter that corresponds to the $q_{new}$.

In one method, after K symbols from the last symbols of a first PDCCH reception that schedules a new transmission for the same HARQ process number as in the PUSCH carrying the MAC CE, or after K symbols from the time when the timer expires, or after K symbols from the last symbol of msgB, or after K symbols from the last symbol of a first PDCCH reception that is addressed to the C-RNTI and contains a UL grant for a new transmission as one of the followings.

1. The UE transmits a PUCCH on a same cell using a same spatial filter as the last PRACH transmission on the same cell.
2. The UE transmits SRS resources contained in a SRS resource set that is configured with the higher layer parameter usage='codebook' using a same spatial filter as the last PRACH transmission on the same cell.
3. The UE transmits SRS resources contained in an SRS resource set that is configured with the higher layer parameter usage='Noncodebook' using a same spatial filter as the last PRACH transmission on the same cell, if the SRS resource set is configured with higher layer parameter associatedCSI-RS.
4. For an SRS resource set configured with higher layer parameter usage='Noncodebook', if the SRS resource set is configured with higher layer parameter associatedCSI-RS, the UE can assume the higher layer parameter associatedCSI-RS is updated to a same spatial filter as the last PRACH transmission on the same cell; or if the SRS resource set is not configured with higher layer parameter associatedCSI-RS, the UE can assume the spatial relation configuration of all SRS resources in that set is updated to be the same spatial filter as the last PRACH transmission on the same cell.
5. For an SRS resource set configured with higher layer parameter usage='antennaSwtiching', the UE transmit one SRS resource in that set with using a same spatial filter as the last PRACH transmission on the same cell.
6. This method can be applied for the UE that does not report supporting beam correspondence in UE capability reporting.
7. This method can be applied if the UE does not include a RS index $q_{new}$ in the MAC-CE message.

In summary, in some embodiments of this disclosure, the following new methods for beam management and SCell beam failure recovery are presented. If a UE is configured to operate beam failure recovery for a BWP of a SCell but the UE is not provided with BFD RSs, the UE shall formulate the BFD RS according to the TCI-states configured to the CORESETs that the UE uses to monitor PDCCH in that BWP of the SCell. The UE can choose up to 2 periodic CSI-RS resources that are configured as QCL-typeD in the TCI-states configured to those CORESETs. If the UE can find more than 2 such periodic CSI-RS resources, the UE can choose two among them with the smallest periodicity, or largest periodicity, or configured to CORESETs with least CORESET ID or configured to CORESETs with largest CORESET IDs.

In some embodiments, the time for the UE to declare that the step-2 MAC-CE of SCell BFR is received by the gNB correctly and declare the finish of beam failure recovery of SCell BFR is: If the step-2 MAC-CE is carried in a PUSCH scheduled by DCI, the time is the last symbol of PDCCH where DCI scheduling new transmission for the same HARQ process is received. If the step-2 MAC-CE is carried in a PUSCH scheduled by a DCI, the time is the time when a first timer expires and the UE does not receive a DCI scheduling re-transmission for the same HARQ process. If the step-2 MAC-CE is carried in a PUSCH of msg3 in a RACH procedure, the time is the last symbol of msg4 of the same RACH procedure is received. If the step-2 MAC-CE is carried in msg A of a 2-step RACH, the time is the last symbol of msgB of the same 2-step RACH is received. If the step-2 MAC-CE is carried in a PUSCH of a configured grant, the time is the time when a second timer expires and the UE does not receive a DCI scheduling re-transmission for the configured grant.

In some embodiments, after k symbols from the time when the UE declare the gNB's response to the step-2 MAC-CE and if the step-2 MAC CE carries a RS ID that indicates one newly identified RS for SCell beam failure recovery, the UE can start to assume: To use the newly identified RS as the spatial relation info for transmission on the PUCCH resources configured in that SCell. To use the newly identified RS as the spatial relation info for the SRS resources configured for codebook-based transmission in that SCell. To use the newly identified RS as the spatial relation info for the SRS resources configured for non-codebook-based transmission in that SCell if associated CSI-RS for the SRS for non-codebook-based transmission is not configured. To use the newly identified RS as the spatial relation info for the SRS resources configured for port switch in that SCell.

Commercial interests for some embodiments are as follows. 1. Solving issues in the prior art. 2. Providing a method for the UE to monitor up to two resources as one or more BFD RSs. 3. Providing a method for defining the timing of gNB's response and also defining a UE behavior. 4. Providing a good communication performance. 5. Providing high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR licensed and non-licensed or shared spectrum communications. Some embodiments of the present disclosure propose technical mechanisms.

FIG. 6 is a block diagram of an example system 700 for wireless communication according to an embodiment of the present disclosure. Embodiments described herein may be implemented into the system using any suitably configured hardware and/or software. FIG. 6 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory. In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite. In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units. If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

The invention claimed is:

1. A method of a beam failure recovery for a secondary cell (SCell) for a user equipment (UE), comprising:
being configured, by a base station, to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell;
wherein the UE derives the one or more resource indexes according to the TCI states configured to the CORESETs that the UE is used to monitor a physical downlink control channel (PDCCH) in a bandwidth part (BWP) of the SCell.

2. The method of claim 1, wherein if there are more than two resource indexes according to the TCI states configured to the CORESETs in the SCell, the UE picks up to the two resources from the more than two resource indexes.

3. The method of claim 1, further comprising transmitting, to the base station, a message carrying a SCell ID of the SCell with the beam failure in a physical uplink shared channel (PUSCH) transmission.

4. The method of claim 3, wherein the message comprises a medium access control (MAC) control element (CE) message.

5. The method of claim 3, wherein after the UE receives, from the base station, a response to the message, the UE declares the message is received by the base station successfully and the UE declares the BFR for the SCell is completed.

6. The method of claim 5, wherein if the message is carried in the PUSCH transmission scheduled by a downlink control information (DCI), the response from the base station for the message comprises at least one of the followings:
the UE receives the DCI from the base station which schedules a new transmission for a same hybrid automatic repeat request (HARQ) process number;
the UE does not receive the DCI from the base station which schedules re-transmission for a same HARQ process number before a first timer expires; or
the UE does not receive the DCI from the base station which schedules re-transmission for a same HARQ process number within a time window that starts after the UE sends the PUSCH transmission carrying the message.

7. The method of claim 5, wherein after k symbols from the time when the UE receives the response from the base station to the message and if the message carries a RS ID that indicates a newly identified RS for SCell BFD, the UE assumes at least one of the followings:
the UE uses the newly identified RS as a spatial relation information for transmission on PUCCH resources configured in the SCell;
the UE uses the newly identified RS as the spatial relation information for sounding reference signal (SRS) resources configured for codebook-based transmission in the SCell;
the UE uses the newly identified RS as the spatial relation information for the SRS resources configured for non-codebook-based transmission in the SCell if an associated CSI-RS for the SRS for non-codebook-based transmission is not configured; or
the UE uses the newly identified RS as the spatial relation information for the SRS resources configured for port switch in the SCell.

8. A user equipment (UE) of a beam failure recovery for a secondary cell (SCell), comprising:
a memory;
a transceiver; and
a processor coupled to the memory and the transceiver, wherein the processor is configured, by a base station, to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell;
wherein the UE derives the one or more resource indexes according to the TCI states configured to the CORESETs that the UE is used to monitor a physical downlink control channel (PDCCH) in a bandwidth part (BWP) of the SCell.

9. The UE of claim 8, wherein if there are more than two resource indexes according to the TCI states configured to the CORESETs in the SCell, the UE picks up to the two resources from the more than two resource indexes.

10. The UE of claim 8, wherein the transceiver is configured to transmit, to the base station, a message carrying a SCell ID of the SCell with the beam failure in a physical uplink shared channel (PUSCH) transmission.

11. The UE of claim 10, wherein the message comprises a medium access control (MAC) control element (CE) message.

12. The UE of claim 10, wherein after the UE receives, from the base station, a response to the message, the UE declares the message is received by the base station successfully and the UE declares the BFR for the SCell is completed.

13. The UE of claim 12, wherein if the message is carried in the PUSCH transmission scheduled by a downlink control information (DCI), the response from the base station for the message comprises at least one of the followings:
the UE receives the DCI from the base station which schedules a new transmission for a same hybrid automatic repeat request (HARQ) process number;
the UE does not receive the DCI from the base station which schedules re-transmission for a same HARQ process number before a first timer expires; or
the UE does not receive the DCI from the base station which schedules re-transmission for a same HARQ process number within a time window that starts after the UE sends the PUSCH transmission carrying the message.

14. The UE of claim 12, wherein after k symbols from the time when the UE receives the response from the base station to the message and if the message carries a RS ID that indicates a newly identified RS for SCell BFD, the UE assumes at least one of the followings:

- the UE uses the newly identified RS as a spatial relation information for transmission on PUCCH resources configured in the SCell;
- the UE uses the newly identified RS as the spatial relation information for sounding reference signal (SRS) resources configured for codebook-based transmission in the SCell;
- the UE uses the newly identified RS as the spatial relation information for the SRS resources configured for non-codebook-based transmission in the SCell if an associated CSI-RS for the SRS for non-codebook-based transmission is not configured; or
- the UE uses the newly identified RS as the spatial relation information for the SRS resources configured for port switch in the SCell.

15. A base station of a beam failure recovery for a secondary cell (SCell), comprising:

- a memory;
- a transceiver; and
- a processor coupled to the memory and the transceiver,
- wherein the processor is configured to configure, to a user equipment (UE), to perform a beam failure recovery on one SCell, wherein when the UE is not provided with one or more resource indexes for detecting beam failure, the UE monitors up to two resources as one or more beam failure detection (BFD) reference signals (RSs) to detect a beam failure of the SCell according to transmission configuration indicator (TCI) states configured to control resource sets (CORESETs) in the SCell;
- wherein the UE derives the one or more resource indexes according to the TCI states configured to the CORESETs that the UE is used to monitor a physical downlink control channel (PDCCH) in a bandwidth part (BWP) of the SCell.

* * * * *